United States Patent [19]

Stobbe

[11] Patent Number: 4,801,786

[45] Date of Patent: Jan. 31, 1989

[54] CHECKING SYSTEM AND METHOD FOR VERIFYING CHECKING STATIONS IN A MONITORING SYSTEM

[76] Inventor: Anatoli Stobbe, Berlinerstrasse 5e, 3013 Barsinghausen 1, Fed. Rep. of Germany

[21] Appl. No.: 836,165

[22] PCT Filed: May 21, 1985

[86] PCT No.: PCT/DE85/00176

§ 371 Date: Jan. 24, 1986

§ 102(e) Date: Jan. 24, 1986

[87] PCT Pub. No.: WO85/05712

PCT Pub. Date: Dec. 19, 1985

[30] Foreign Application Priority Data

May 25, 1984 [DE] Fed. Rep. of Germany ....... 3420100

[51] Int. Cl.[4] ............................................ G06K 7/10

[52] U.S. Cl. .................................. 235/377; 235/449; 235/454; 235/472; 235/487; 340/825.52

[58] Field of Search ............... 235/377, 449, 462, 472, 235/482, 454, 468, 383, 487, 459; 340/825.52, 825.31

[56] References Cited

U.S. PATENT DOCUMENTS 3,925,639 12/1975 Hester ............................ 235/472 X
3,959,633 5/1976 Lawrence et al. ............. 235/459 X
4,002,889 1/1977 Hoyer-Ellefsen .................. 235/487
4,338,601 7/1982 Nance-Kivell ............ 340/825.31 X
4,354,100 10/1982 Rohen ................................ 235/449
4,359,633 11/1982 Bianco ................................ 235/468
4,415,065 11/1983 Sandstedt ....................... 235/383 X
4,449,248 5/1984 Leslie et al. ............... 340/825.52 X
4,465,926 8/1984 Apitz et al. ...................... 235/454 X
4,625,100 11/1986 Smith .............................. 235/377 X

*Primary Examiner*—David L. Trafton
*Attorney, Agent, or Firm*—Collard, Roe & Galgano

[57] ABSTRACT

A control system is provided having stationary check points which are contactlessly read by a data collector and verified. The data so read can be stored and transmitted by a transmitter to a central unit, where the data so received are centrally evaluated. Together with the data of the check point being read, the time at which the respective check point is read is transmitted to the central unit as well. If all data are received by the central unit, it transmits back a verification entry, and the data are subsequently stored in a memory together with such verification entry. If no verification entry is received, the data are automatically and continually retransmitted to the central unit until the verification entry is received by the receiver in the data collector. In addition, the data collector has a random generator capable of establishing which individual check points are to be successively called on by the security guard. Each check point is to be called on within a time range and, if such time limit is exceeded, an emergency call is automatically transmitted to the central unit.

13 Claims, 6 Drawing Sheets

CHECKING SYSTEM AND METHOD FOR VERIFYING CHECKING STATIONS IN A MONITORING SYSTEM

The invention relates to a checking system having at least one stationary check point and a central data collector, which is associated with the check points, for verifying the individual check points, an identification being allocated to each check point. In addition, the invention deals with a method for verifying check points in a monitoring system, the verification including an item of time information and an identification associated with the respective check point.

It is known that checking systems of the abovementioned type are extensively used for protecting buildings or sections of buildings to a large degree against breakins or unauthorised entering, especially outside the usual business hours.

Whilst, for example in the case of residential houses (that is to say with small easily checked objects), in most cases electronic alarm systems are used which operate automatically, a check by guard personnel is customary in the case of larger objects such as a factory, a refinery, a bank and so forth. Several systems or methods are known which can be classified under the two terms "check by watchmen" and "protection by watchmen".

In the method of the check by watchmen, the time clock known for a long time is used. At each of the check points arranged at several places of the object to be secured, a keybox contains a key, the key bit of which is mechanically coded and identifies the respective check point. The key is inserted by the watchman into the time clock which then records, by means of a printing mechanism, the time, the date and the number of the check point, that is to say the number of the key, on a check strip.

The essential feature is in this case that the watchman checks the individual check points, as also expressed in the keyboard "checking by watchmen". However, this checking is associated with considerable disadvantages.

A continuous, reliable monitoring record, which can be rapidly evaluated, is demanded by more and more firms and also by the insurance companies. But the check strip, which can be several metres long in the case of large objects which are to be monitored and which have many check points, to be called at at time intervals, is difficult to evaluate and read. This leads to the fact that the check strips of the time clock are frequently deposited unread. The control strip is used and checked only when a case of damage or an insurance case has actually occurred.

It is possible to check the checking round of the watchman only after the watchman verifies the check points on a prescribed route and has subsequently handed over the time clock containing the check strip at the central station. During the walk along the route itself, therefore, no contact exists with the central point. For this reason, it must be considered that the guard personnel, which is frequently exposed to dangers during the checking rounds, are inadequately protected.

In addition, the security against deliberate manipulations must be graded as very low with the method of checking by watchmen involving the mechanical time clock and the check keys. With some skill, it is quite easily possible to simulate the verification of a check point without the watchman actually having called at the checkpoint. This is because it is not particularly difficult to copy a check key so that, for example, an external check point can be passed by and the verification can be simulated by means of the substitute key. The low security against manipulation can therefore lead to inadequate protection because of checking routes not being completed.

Finally, the number of possibilities of mechanically coding the key bits is limited and with a customary system, at present only 999 different keys, that is to say check points, with the appropriate numbering are possible. Although this may be adequate with individual systems, it can happen with several locally separate plants having the same system that one key having a certain number exists several times overall. In such a case, for example, a check key from Northern Germany could be used to acknowledge a check point of another object in Southern Germany.

In the monitoring system which has become known by the term protection by watchmen, a radio communication unit having a transmitting and receiving section is used instead of the time clock. In contrast to the method of checking by watchmen, it is therefore possible in this case to have continuous contact between the watchman and the central station which provides the possibility of better protection of the watchman and of more rapid detection of a break-in.

For the purpose of verifying the individual check points, these are constructed in such a manner that the radio communication unit can be "inserted" into the check point. A radio signal containing the number of the check point, but not the time, is then sent to the central station. The time is detected on reception by the central station which then confirms the reception by sending out a verification signal which produces an acoustical or optical signal at the radio communication unit. The watchman can now remove the radio communication unit from the check point and continue his round.

Although the use of a portable radio communication unit reduces some of the disadvantages initially described, the possibilities of application of the method of protection by watchmen are, nevertheless, also limited and associated with disadvantages. In the case of larger objects, for example in an oil refinery, it can frequently happen that a check point is located in a "radio pocket" so that no radio contact with the central station is possible from this check point. Such radio pockets occur, for example, as a result of larger metal containers (for example a cooling tower) or the like.

In addition, the radio communication units cannot be used, either, when checking rooms specially protected with metal, for example the vault of a bank, because the radio signals cannot penetrate the walls.

Overall, therefore, it must be noted that the known monitoring systems are not free of disadvantages so that an optimum protection of object and person is not possible. This is the point of application of the invention which has the basic objective of creating a checking system which provides a possibility of much better protection and a much better check, which is secure against manipulations, by using simple means. In addition, the invention is to provide the possibility of a method for verifying check points in a monitoring system.

To achieve this objective, it is provided in a checking system according to the precharacterising clause of claim 1 that each check point is formed by a data carrier which can be sampled in contactless manner, the data being stored or arranged along an area and locally separated from each other and that the data carrier has a data read head for the serial reading of the data when the read head or the data collector is moved over the data carrier and an electronic memory which is connected to the read head.

By using an electronic memory and by means of the data carrier which can be sampled in contactless manner and the data of which can be coded and stored in digital technology in the form of individual bits, it is possible, with the invention, to code and to store a virtually unlimited number of different numbers. This makes it possible to ensure that each number of a check point really does occur only once even within a large location area having several objects to be monitored. This considerably increases the security against manipulation.

Verification or confirmation of a check point is extremely simple with the invention because it is sufficient to "sweep" the data collector manually once from top to bottom over the data carrier - check point. During this process, the data of the check point are dynamically transferred into the memory by a serial reading process. In this manner, all data of a checking round can be stored. The data can then be listed or printed out and displayed later in a central station using a personal computer or similar.

During the verification of a check point, a tedious insertion (either of a key into a time clock or of a radio communication unit into the check point itself) is unnecessary. As the previously required mechanism is eliminated, the devices according to the invention operate with extreme insensitivity to interference, quite apart from the previously mentioned feature of very simple operation.

Both the data carrier and the data collector can be accommodated in each case in a handy plastic housing. In this arrangement, the data carrier can be constructed to be extremely flat since it merely contains a code strip under its read area. On the code strip, the data of the respective data carrier or the respective check point can be arranged in bit form. The data carrier can be mounted at a desired check point, for example by bonding or screwing. It is also possible to change the location of the check points in simple manner in the course of time.

In order to keep the dimensions of the data collector manageable, a rechargeable, relatively small battery is used as power supply. According to an advantageous development of the invention, it is provided that the source of operating voltage does not remain continuously switched on but is switched on only immediately before the serial reading of the data of a check point for a brief period during the reading process. This makes it possible to increase the life of the battery considerably.

The abovementioned switching-on of the operating voltage source is carried out by a sensor which can be activated in contactless manner and which forms, as it were, a second read head at the data collector. This sensor responds to a magnet which is located above the read area behind an inclined area at the data collector. Thus, when the data collector is manually moved from top to bottom on the surface of the data carrier for verifying a check point, first the operating voltage source is switched on and subsequently the data are sampled and stored.

Another significant advantage of the invention consists in the fact that the data collector can be connected to a radio communication unit having a transmitting and receiving section in order to send the data stored to a central station from where the reception can be verified.

During this process, the data of the individual check points, located in the memory, are sampled, transmitted and, after transmission, "stored" again in the memory, with the "note" that the data of the check point concerned have been transmitted and have been received by the central station.

According to another feature of the invention, the data collector contains "intelligence" in the form of a microprocessor. This creates hitherto unknown possibilities in the sense of increased security for the monitoring system.

Thus, the microprocessor can be used - if necessary by using a random generator - to establish the respective round on different days. A certain sequence, in which the individual check points must be sampled, can therefore be randomly predetermined. After verification of a first check point, a display of the data collector shows the watchman the next check point at which he has to call. Besides the date, the time and the number of the respective check point, the selected route of the round is then also stored in the memory.

According to the invention, the risk of any manipulations can also be effectively countered and security can be increased by the fact that the data collector comprises a clock chip as a time base and that the "instruction" is given to verify certain check points within a certain time window - that is to say within a certain period of time. In this case, therefore, at the beginning of the round all check points are stored in the microprocessor memory with a time at which they must be reached. If the check point concerned has not been reached within a certain time window, a code call can be sent to the central station by means of the transmitter. This makes it possible to detect irregularities immediately.

In addition, the use of a microprocessor inside the data collector creates another very significant advantage. In the introduction to the description it has already been mentioned above that in the case of the known protection by watchmen using a radio communication unit, the disadvantage can occur that the watchman and his radio communication unit are located in a radio pocket and he can therefore not communicate with the central station. In the checking system according to the invention, the microprocessor makes it quite easily possible that in such a case, that is to say when the "radio message" cannot be received by the central station because of a radio pocket, this radio message is automatically repeated at certain time intervals. The automatic transmission of the data of the check points approached in the meantime is repeated until the verification by the central station concerning the reception of these data is received. These corresponding data are then again stored in the memory together with the reception note.

The automatic and periodic transmission of the data present in the memory is of decisive advantage especially with so-called territorial services. In this case, several objects are monitored by guard personnel or by a watchman who successively calls at and checks the objects to be monitored with a vehicle. The transmitter for transmitting the data stored in the memory of the data collector can here be arranged in the vehicle. When the watchman has finished his round at one object, the data collector is inserted into a holder and during this process is automatically connected to the transmitter so that the data can now be transmitted by radio to the central station. In the event of radio pockets, the transmission is repeated until it is received at the central station, as has been mentioned.

Overall, the invention combines in surprising manner some of the features of both the method of checking by watchmen and of the method of protection by watchmen, the totality of these features leading to a completely new checking system having the abovementioned advantages. In the sense of the method of checking by watchmen, the individual check points are sampled as before but the mechanism, which is susceptible to interference and also requires a lot of maintenance, is replaced by electronics, the electronics also leading to the advantage that manipulations are virtually eliminated. In addition, the concept of protection by watchmen of being able to establish as rapid as possible a connection to the central station has been taken up in the invention, in such a manner that this fundamental concept is not disturbed even by radio pockets which may exist. Thus, the novel checking system can be used, for example, even when the check points are located in rooms screened by metals, (for example the vault of a bank). The invention thus decisively improves the features of the methods of protection by watchmen and of checking by watchmen.

Further advantageous embodiments and suitable further developments of the invention and the method according to the invention are specified in the claims and can be found in the drawing.

In the text which follows, the invention is explained in greater detail with the aid of the illustrative embodiment shown in the drawing, in which.

Figure 1:
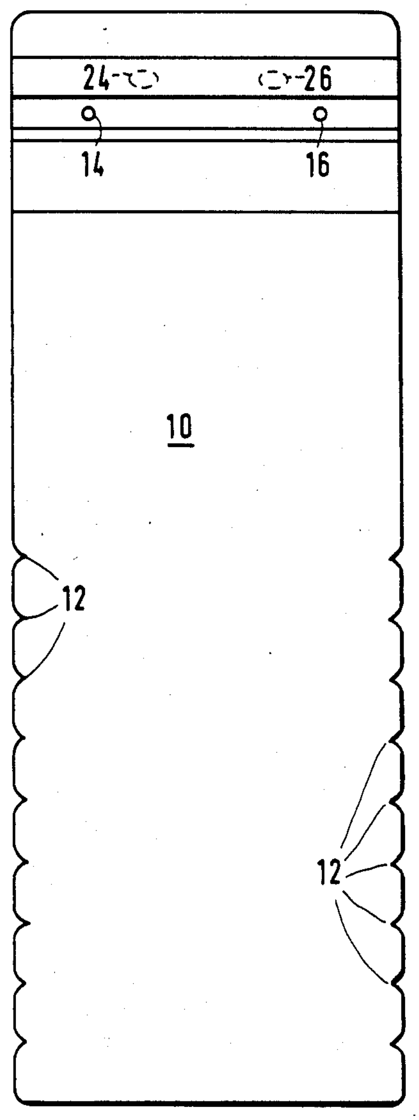
FIGS. 1 to 3 shows several views of a data collector.
Figure 2:
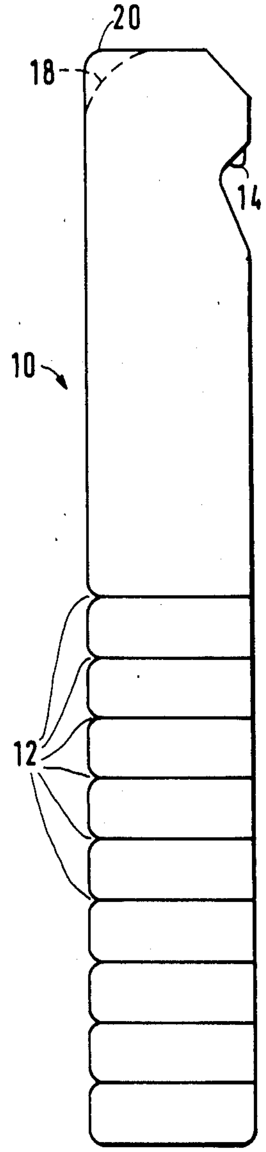
Figure 3:
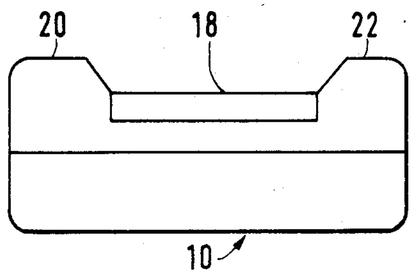

The data collector 10, shown in a drawing in FIGS. 1–3, has in its lower area notches 12 so that the data collector 10 can be gripped by hand without slipping. In the top view of FIG. 1 it can be seen that the data collector 10 has two light-emitting diodes 14 and 16. As will be explained in greater detail further below, the one light-emitting diode 14 signals that the data collector is switched on whilst the other light-emitting diode 16 indicates the reading of a data carrier 28 (see FIG. 6) at the end when the data read have been stored.

In the top view of FIG. 3, two projections 20 and 22 can be seen which, between them, form a read track 18. In the area of this read track, the data read head 24 and a sensor 26, drawn with dashed lines, are located inside the data collector 10 close to the surface of the read track 18. The width of the read track 18 has been selected in such a manner that it can be used to detect the read area 32 of the data carrier 28 shown in FIGS. 4 and 5.

Figure 4:
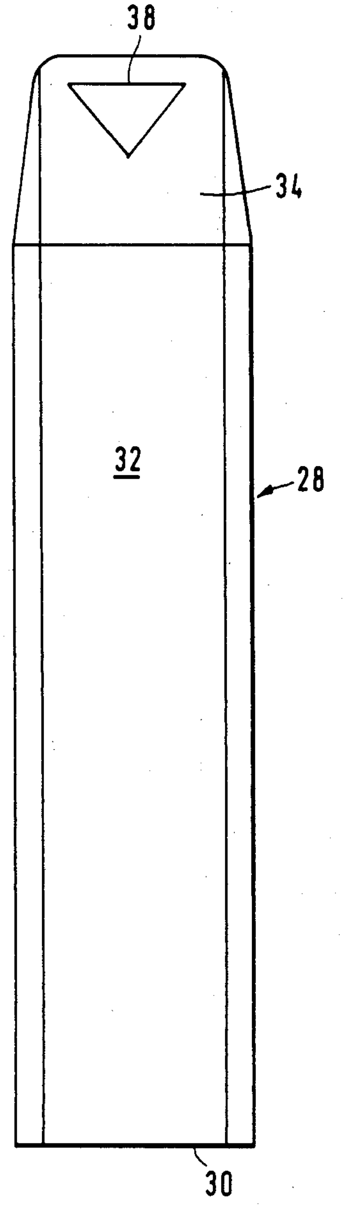
FIGS. 4–5 show a top view and a side view of a data carrier.
Figure 5:
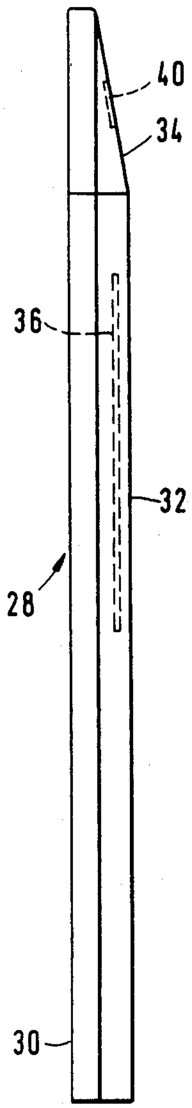

The data carrier 28, forming a control point in a control system, is shown in closer detail in FIGS. 4 and 5 in a top view and a side view. The data carrier 28 has a flat housing 30 which preferably consists of plastic. The read area 32 is adjoined at the top by an inclined area 34 to which an arrow symbol 38 is applied. The arrow symbol 38 indicates to the user that the data collector 10, as shown in FIG. 6, is moved in the direction of the arrow 44 with the read track 18 from top to bottom on the data carrier 28, this movement beginning on the inclined area 34.

Behind the inclined area 34, a switching-on magnet 40 is located by means of which the sensor 26 of the data collector 10 is activated to switch on an operating voltage source 64 (see FIG. 8) for a certain period of time. During the period when the data collector 10 and its read track 18 is subsequently pulled over the read area 32 of the data carrier 28, the associated data are magnetically read by the data collector 10 by means of the data read head 24.

The data themselves are located behind the read area on a code strip 36 which is shown in FIG. 5 with dashed lines. This code strip can be inserted into the housing 30 and subsequently moulded in by means of a moulding compound so that it is no longer accessible from the outside in order to eliminate manipulations.

Figure 6:
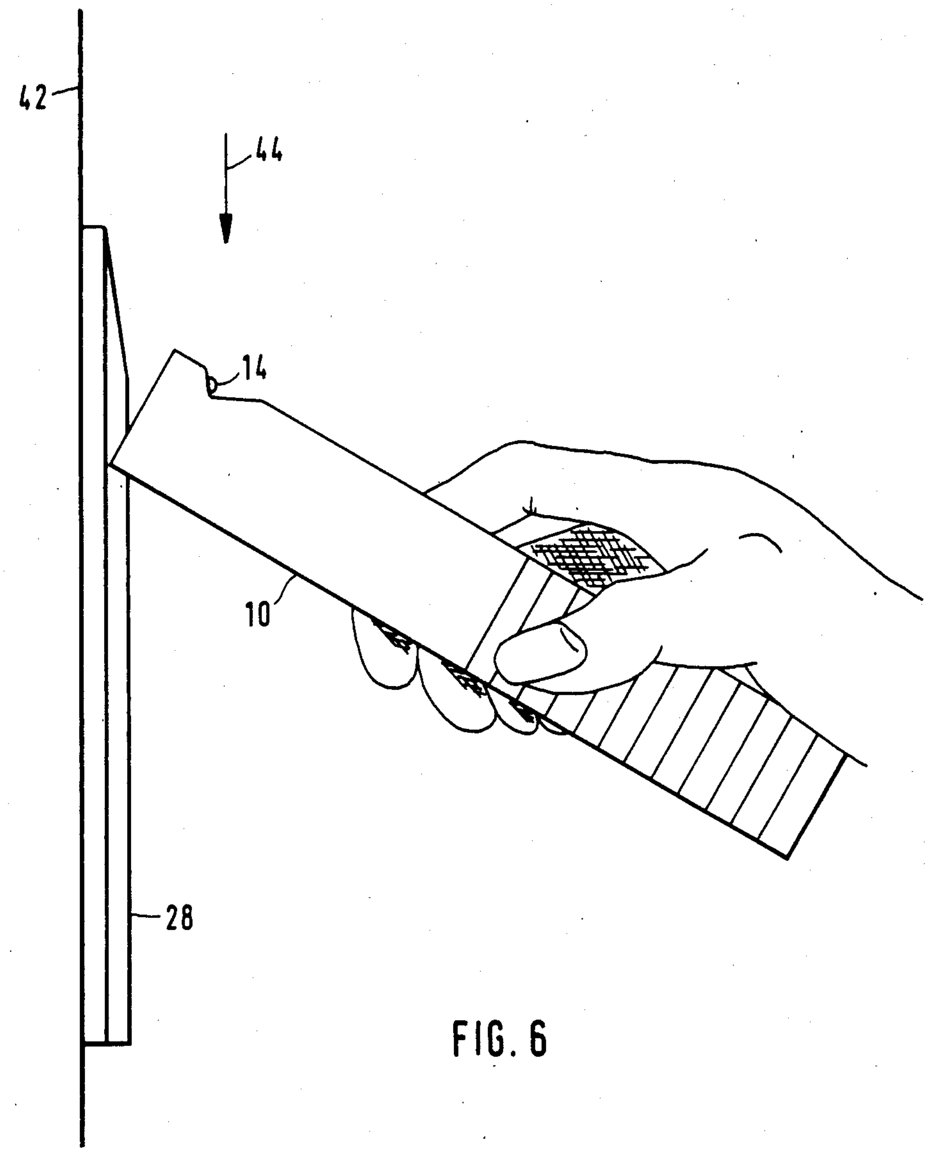
FIG. 6 shows a data carrier and a data collector during the process of a check point verification.

In addition to illustrating the afore-mentioned easy manipulation of the data collector 10 for verifying a data carrier 28, i.e., a check point, FIG. 6 shows that the flat housing 30 of the data carrier 28 can be mounted in a simple manner on a wall 42, for example by glueing.

Figure 7:
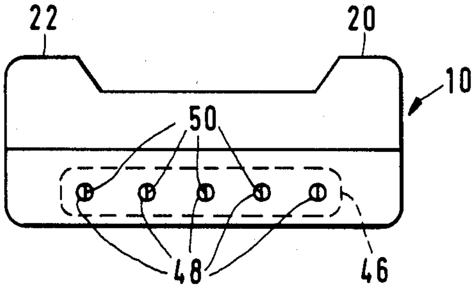
FIG. 7 shows another view of the data collector, seen from underneath.

FIG. 7 shows that the data collector 10 has a connector strip 46 with the blade contacts 50 mounted at its bottom end, but within the housing. Said blade contacts 50 are protected in that they are accessible only via corresponding openings. It is described in the following that the data collector 10 can be inserted in a loading station 80 (see FIG. 10) adapted to match its shape, whereby the blade contacts 50 engage associated contact pins.

Figure 8:
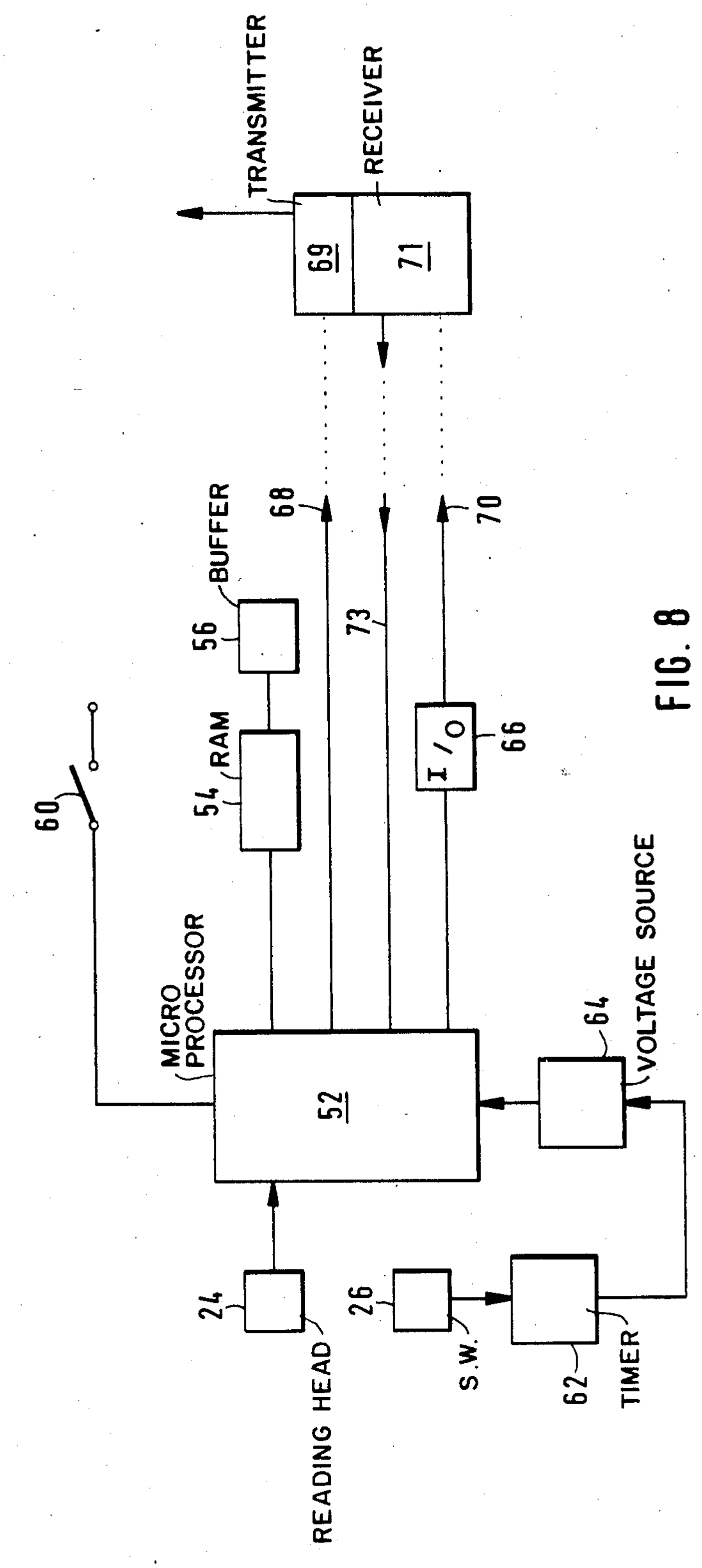
FIG. 8 shows a basic block diagram of the data collector.

FIG. 8 shows the basic circuit diagram illustrating the electrical make-up of a data collector 10. The basic components are a microprocessor 52, a memory 54, and a buffer (or bank of buffers) 56. For control purposes, said microprocessor 52 is connected to the memory 54 and to the buffer 56 as well.

Furthermore, the data collector 10, in addition to having the operating voltage source 64, which can be switched on for a selectable duration via the sensor 26 by means of a timing switch 62, has a data read head 24 connected to the microprocessor 52, in order to process and store the data of the code strip 36, which data are read in the digital form.

Also, a serial interface 66 is connected to the microprocessor 52, said interface leading to the connector strip 46 or transmitter 69, as shown by the arrow 70. In addition, the data collector 10 has an emergency call key 60 (which can also be used as verification key) and a control connection to the transmitter 69, having a receiving section 71, can be established via a connection indicated by the arrow 68. This transmitter can be used for transmitting data stored in the memory 54 to a central station and it is also possible to emit an emergency call via the transmitter 69 by operating the emergency call key 60.

Normally, the transmitter 69 with its receiving section 71 is provided as a separate assembly, for example in a vehicle of the guard personnel but it is also possible to integrate the transmitter 69 with the data collector 10 as one unit. In the first-mentioned case, the data collector 10 can be introduced into a corresponding opening of the transmitter 69 in order to establish the required electrical connections by means of the connector strip 46. Outside the individual check points, the transmitter 69 is then simultaneously used as depository for the data collector 10. The confirmation note from the central station reaches the microprocessor 52 via the connection 73.

Figure 9:
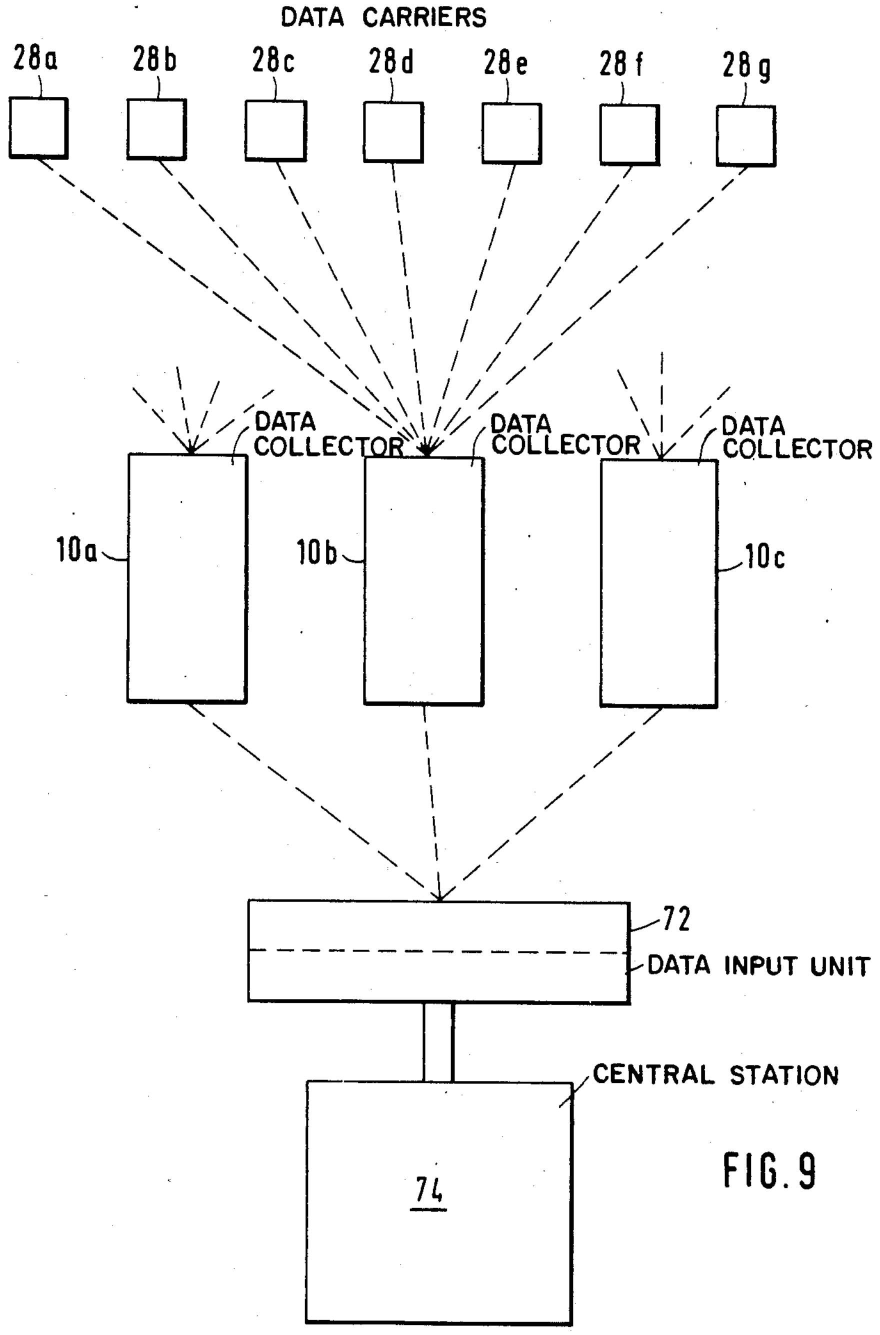
FIG. 9 shows a basic illustration of a check system including a central station for evaluation.

FIG. 9 shows as a basic circuit diagram a complete checking system including subsequent evaluation via a data input unit 72, having a central station 74. The various check points of an object to be monitored are formed by the data carriers 28*a*–28*g*. The check points can be sampled and verified by the guard personnel by means of data collectors 10*a*–10*c*.

Each data collector 10*a*–10*c* stores the data read from the data carriers and the time and the date. After a round has been completed, the data stored are entered into a data input unit 72 and evaluated in a central station 74.

Figure 10:
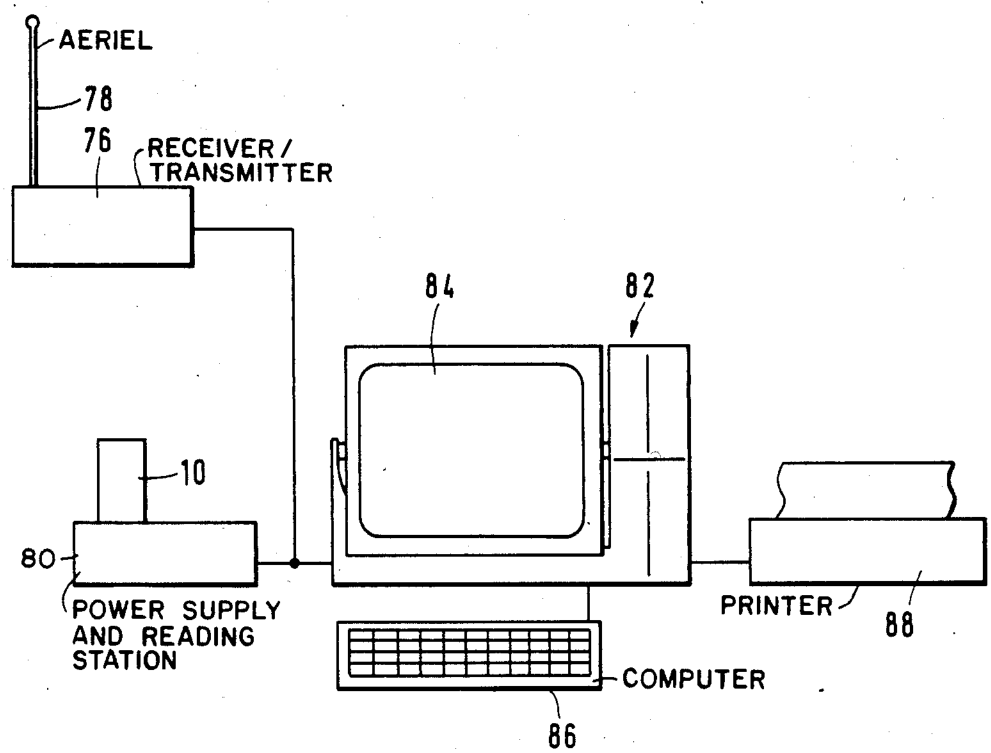
FIG. 10 shows the basic illustration of a central station.

According to the basic block diagram in FIG. 10, such a central station comprises a loading station 80 having an opening into which the data collector 10 can be inserted. The electrical connection established in this process can be used, on the one hand, for charging the operating voltage source of the data collector 10 and, on the other hand, for sampling the stored data and displaying them on the screen 84 of a computer 82. This can be a conventional personal computer having a keyboard 86 and a connected printer 88. Thus, after the data collector 10 has been inserted into the loading station 80, it is simultaneously possible to obtain a listing printout concerning the round completed.

The listing printout can be kept in an easily comprehensible form by the appropriate software. Possible printouts are, for example: "South gate checked at 23.00 hours; North gate checked at 23.30 hours; Main entrance: error indication, and so forth".

The central station 74 also comprises a radio receiving unit 76 having an antenna 78. In the case already described where—automatically at periodic intervals in the case of a radio pocket—the verified data are to be transmitted by means of the transmitter 69 to the central station 74, these data can be received by means of the radio receiving unit 76 and passed on to the computer 82. The confirmation relating to the reception of the data is subsequently transmitted to the respective data collector 10 (receiving section 71) by means of a transmitter, not shown.

It has already been explained with the aid of FIG. 5 that each data carrier has a code strip 36 which carries the data identifying the respective check point. In this arrangement, the data can be formed by individual magnetic bits which are spatially arranged at a distance from one another in a pattern on the code strip 36. During the motion of the data collector 10 along the read area 32 of the data carrier 28, the data read head 24 registers the individual bits which are then digitally stored in the memory 54. The individual bits can be used in various known forms of code, that is to say the numbers of the respective check points are present in coded form on the code strip 36.

Apart from the magnetically based coding, it is also possible to use infrared light. In this case, the read area 32 of the data carrier 28 consists of a material transparent to infrared. Behind the read area, materials are located which reflect or do not reflect the infrared light in accordance with the digital "zero" and "one" signals. The read head of the associated data collector consists in this case of an infrared source and a receiver for the reflected infrared light.

Independently of what type of coding is used, the identification data of a check point can be serially read and stored in a memory in a simple manner in the check system according to the invention. In connection with the microprocessor 52, a wealth of possible applications and variants are then obtained which make the control system particularly secure. For the first time, it is also possible to provide an "instant" log listing relating to a round and this log listing can have any desired form by means of appropriate software.

It has already been mentioned further above that the time switch 62, which switches the data collector 10 on for a selectable period of time, can be switched on by moving the sensor 26 or the data collector 10 along the inclined area 34 of the data carrier 28. It is then particularly advantageous if the switch is switched off even before this selectable fixed period of time has elapsed, if a valid or invalid check point is detected. This makes it possible to achieve a considerable saving in power with respect to the electrical power. It is thus possible, for example, to switch off after only one second instead of after about 3 seconds.

Finally, another advantageous aspect of the invention should be pointed out which consists in the fact that, instead of the protected connector strip 46 having the contacts 50 (see FIG. 7), a contactless remote feed device without contacts and several data transmission paths without contacts can be provided. This makes it possible, for example, if an accumulator is used, to carry out a charging operation inductively.

The data transmission path can be constructed to be both inductive and optical.

In the case described, the data collector 10 can be constructed as a black box, as it were, which no longer has any external operating elements. This achieves very high security against manipulations since operation and use take place completely without contacts. The installation of an emergency call key for transmitting an emergency call is omitted in this case.

What is claimed is:

1. A control system having at least one stationary control point, each control point having a contactlessly queried data carrier containing an identification, a data collector associated with the control points for verifying the individual control points, the data collector having a data reading head for serially reading the identification as the data collector moves across the data carrier, an electronic memory connected to the data reading head for receiving the data conforming to the identification, a transmitter for transmitting to a central unit the data corresponding to the identification, and an emergency call key for switching on the transmitter, wherein:

said data collector further including a microprocessor for controlling said memory and said transmitter, a clock chip whose time data together with the identification data is transmitted and stored in said central unit, a random generator and an optical display whereby random sequences of control points may be input and the corresponding data carriers sequentially identified on the display as determined by the random generator;

said transmitter further including a receiving unit, the transmitted data and a verification entry received by the receiving unit from said central unit are transferred to said memory, and means causing said transmitter to repeatedly transmit the identification data and time data at time intervals until a verification entry is received by the receiving unit from the central unit;

said memory being adapted to store all data of a route which encompasses several control points;

said central unit comprising a computer which interprets the routes and is connected to a central printer; and means for automatically transmitting an emergency call to said central unit when a time range associated with each control point within which a respective control point must be verified is exceeded, said emergency call identifying the non-verified control point.

2. Checking system according to claim 1, characterised in that the data collector 10 can be connected to a transmitter 69, which comprises a receiving section 71, for transmitting the data read and stored to a central station 71.

3. The control system according to claim 1, wherein in that the data carrier 28 comprises a flat housing 30 having a read area 32 and an inclined area 34 which adjoins the read area at the top of the latter.

4. The control system according to claim 3, wherein inside the housing 30 behind the read area 32, a code strip 36 is located on which the data of the data carrier 28 are magnetically arranged as "magnetic bits".

5. The control system according to claim 3, wherein the read area 32 is formed by a material which is transparent to infrared and behind which reflectors for infrared light are arranged in accordance with a code.

6. The control system according to claim 1, wherein the data collector 10 has an operating voltage source 64 which can be switched on by means of a sensor 26 which can be activated in contactless manner.

7. The control system according to claim 6, wherein a timing switch 62, which switches the data collector 10 on for a selectable period of time and switches off before the period of time has elapsed if a valid or invalid check point 28 has been detected, can be switched on by moving the sensor 26 or the data collector 10 along an inclined area 34 of the data carrier 28.

8. System according to claim 1, wherein the data collector 10 includes a bank of buffers 56.

9. The control system according to claim 1, wherein the data collector 10 has at its bottom side a protected connector strip 46 the contacts 50 of which are accessible via openings.

10. The control system according to claim 1, wherein the data collector has at its bottom side a contactless remote feed device and is provided with several contactless data transmission paths.

11. Method for verifying check points in a monitoring system, the verification comprising an item of time information and an identification associated with the respective check point, wherein the identification data are serially sampled by means of a data collector 10 and are stored, ready for being called up, in a memory 54, 56, and the identification data and the items of time information of the verification are transmitted at repeated intervals, until a confirmation relating to the reception of the transmission is received in a data-collector receiver 71 from a receiving central station 74.

12. Method according to claim 10, wherein after the confirmation, the items of information transmitted are again stored, together with a confirmation note, in a memory inside the data collector 10.

13. Method for verifying check points in a monitoring system, the verification comprising an item of time information and an identification associated with the respective check point, wherein the identification data are serially sampled by means of a data collector 10 and are stored, ready for being called up, in a memory 54, 56, and each check point is associated with a "time window" within the range of time of which the respective check point must be verified and that, when a time window is exceeded, an emergency call, specifying the non-verified check point, is automatically transmitted to the receiving central station 74.

* * * * *